J. Woodward,
Hydrant,
N°2,858.   Patented Nov. 21, 1842.
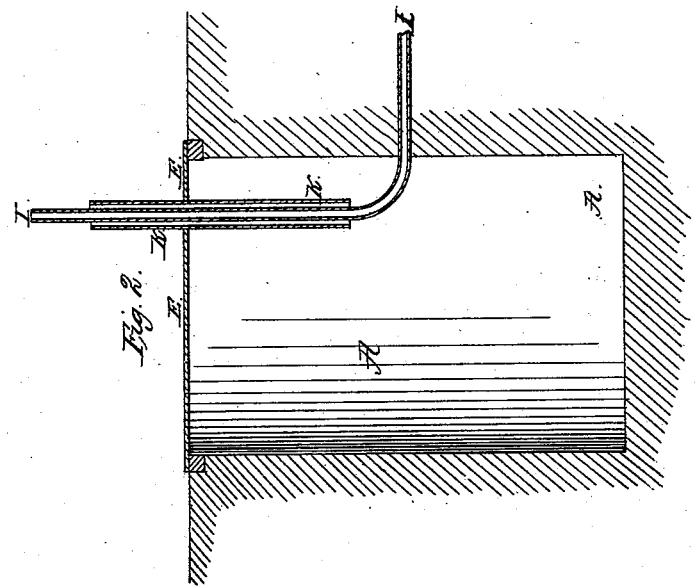
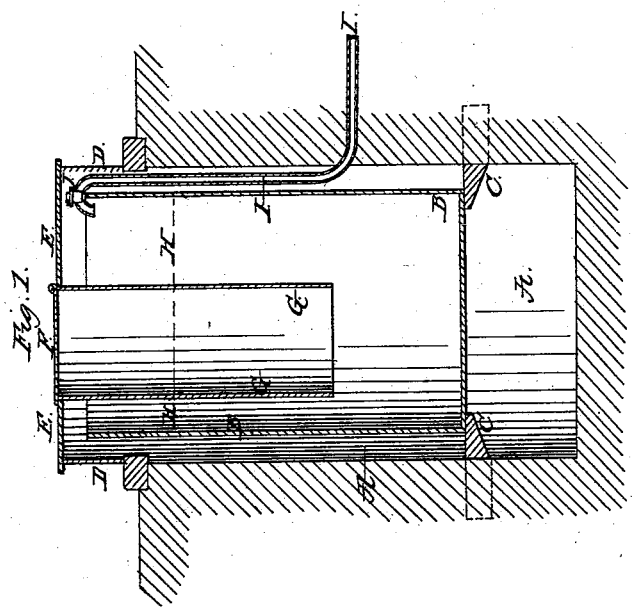

UNITED STATES PATENT OFFICE.

JOSHUA WOODWARD, OF HAVERHILL, NEW HAMPSHIRE.

CISTERN FOR PREVENTING WATER FROM FREEZING.

Specification of Letters Patent No. 2,858, dated November 21, 1842.

*To all whom it may concern:*

Be it known that I, JOSHUA WOODWARD, of Haverhill, in the county of Grafton and State of New Hampshire, have invented a new and useful Improvement in the Manner of Constructing and Arranging an Apparatus for the Supply of Water for Domestic Purposes so as to Prevent Its Freezing in Winter; and I do hereby declare that the following is a full and exact description thereof.

My improvement in the manner of preventing water from freezing is intended principally to be applied in those situations where water is conducted through pipes into a cistern, or into a dwelling from any suitable reservoir, or source, in climates where it is frequently liable to freeze. The principle upon which I proceed in preventing the water so supplied from freezing is, that the exhalations of air and vapor which emanate from the ground at the depth of four or five feet, more or less, below the surface, according to the location, is at a temperature some degrees above the freezing point, and that such exhalation may be applied to the preserving of a corresponding temperature in a vessel containing water, and thus prevent its freezing. The manner in which I apply this principle so as to attain the desired end is the following. I make an excavation in the ground, which may be most conveniently made circular, in the manner of a well, sinking it to the depth of six, eight, ten or more feet, more or less. If the soil is such as will not be liable to cave in, it may be left unsupported; otherwise it may be loosely bricked around or supported in any other convenient way. A pipe of lead, or other material, through which the supply water is to flow, is allowed to enter this excavation at such depth as may be necessary effectually to protect it from the frost at all seasons; say at a depth of four feet. When it is desired to collect water in a cistern, or reservoir, within this excavation, I prepare a vessel, which I prefer to make of wood, from four to six inches, (more or less,) less in its exterior diameter, than that of the excavation, so as to leave a space of two or three inches all around, between it and the surrounding earth, when placed therein. This vessel is to be put into the cavity formed in the ground, and it will be found most convenient to allow its upper edge to rise a few inches above it, and to be surrounded by a curb. Its bottom is to rest on brackets, or cross timbers, or other suitable support. The depth of this vessel may be three, four, or more feet, according to circumstances. The curb by which its upper edge is surrounded is to be inclosed by a close fitting cover, furnished with a hinged shutter, which is to be opened when water is to be obtained. The pipe through which the water is to be supplied is made to conduct it up into this cistern, it being carried up in the annular space between the cistern and the ground, and over the edge of the cistern, its flow being governed by a cock.

When it is desired to elevate the water to any considerable height, and to convey it into a building, the cistern will not be required, but the excavation is to be made in the ground, and a close fitting cover placed over it, as in the former case. The supply pipe is to lead into the excavation in the same manner as when the cistern is used, but the supply pipe is to pass up through the cover, surrounded by another pipe sufficiently large to leave an air space of half an inch or more between it and the supply pipe. This exterior pipe may be of wood, and it may be continued up, with the supply pipe, to any height to which the pressure of the water in the reservoir from which the supply is obtained will enable it to rise, say to that of two or three stories. When the apparatus is thus constructed and arranged the emanation of warm air and vapor from the earth will effectually prevent the water contained in the cistern, on passing up in the supply pipe, from freezing, as has been fully proved by well tested experiment during the severity of two cold winters in the climate of New Hampshire.

In the accompanying drawing I have, in Figure 1, represented the manner in which a cistern may be supplied and kept filled with water without liability to freeze; and in Fig. 2 the manner of supplying water to the interior of a building with a like beneficial result.

A, A, is an excavation made in the ground, of the required diameter and depth, B, B, is a cistern, or vessel, placed in said excavation, and resting on brackets C, C, leaving a considerable space between its bottom and that of the excavation.

D D is a curb, shown as surrounding the excavation, and having a close fitting cover E, E, of plank.

F, is a lid, or door, which is to be opened when water is to be obtained.

G, G, is a trunk, or large tube, which is inclosed by the door, and is open at both ends, and made of sufficient size to allow a bucket to pass through it, for the dipping of water. The lower end of this trunk is always to be below the surface of the water in the cistern, so as to cut off the space above said water from communication with the external air.

The height of water in the cistern may be represented by the dotted line H, H. The pipe I, I, by which the water is to be supplied, enters the excavation A, below the line of frost, and ascends through the annular space between the cistern and the ground, and may be governed by a cock at J, so as to fill the cistern to the required height. Should any be allowed to run over the top, it will descend to the bottom of the excavation, and be absorbed by the earth. In cold weather the lid F should be kept closed, excepting when water is to be drawn. Under this arrangement warm air and vapor emanating from the ground will, as before observed, in passing through the space between the cistern and the surrounding ground, effectually prevent the contained water from freezing. The unavoidable passages for air which will exist in the cover, and curb, will allow the emanating matter to pass off slowly, so as to admit of a continued current upward. Any large opening that would admit the external air freely would defeat the purpose of the arrangement.

In Fig. 2, the excavation A, A is represented as having its cover E, E, even with the ground. The pipe I, I, which supplies the water ascends through the cover, and is surrounded by the pipe, or tube K, K, which extends down nearly to the point where the water pipe enters. It is open at its lower end, to admit of the passage of the emanating matter through it, and is to be continued up as high as the pipe I, is carried; and the water contained in this pipe will, thereby, be kept from freezing. The excavation A, may be made in a cellar, or in any other convenient place.

I have it in contemplation to apply the same principle to the construction of a closet, or other apartment in a building which is to contain articles to be kept from freezing and when I have completed my arrangement for so doing, shall add the description thereof to this specification.

In situations where the supply of water is to be obtained from a well by means of a pump, it may be received therefrom, and kept from freezing, in a cistern arranged like that shown in Fig. 1, and will then be ready at all times, for the use of cattle, or for other purposes.

Having thus fully described the nature of my improvement in the manner of preventing the freezing of water, what I claim therein as new, and desire to secure by Letters Patent, is—

The taking advantage of the temperature of the earth below the point of frost, and of the temperature of the air, or vapor, emanating therefrom, by making an excavation in the ground to a depth greater than that to which its temperature may at any time be reduced to the freezing point; by covering said excavation as described and by diverting and governing the emanation from the ground, so as to cause it to surround the water which is to be kept from freezing; the whole being effected by an arrangement of the respective parts of the apparatus, or structure, substantially the same with that herein fully set forth and made known.

JOSHUA WOODWARD.

Witnesses:
Thos. P. Jones,
Edwin L. Brundage.